June 23, 1970  V. L. MONTANTI  3,516,408
ARTERIAL BYPASS
Filed Sept. 21, 1967
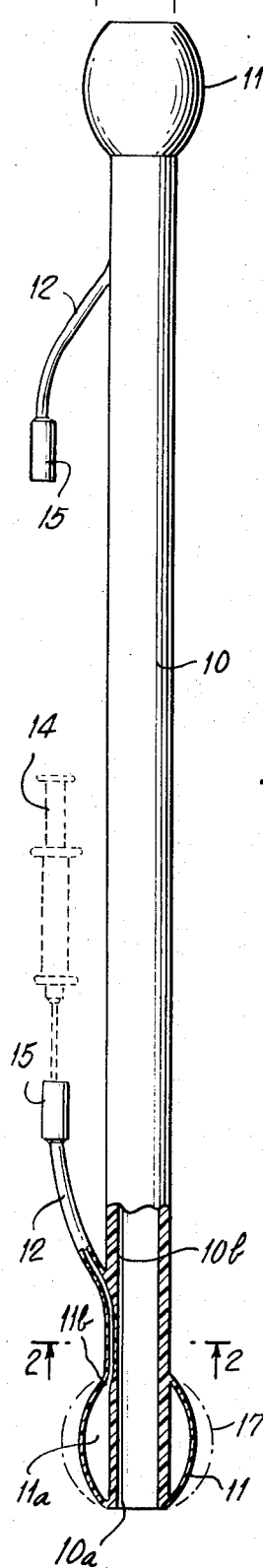
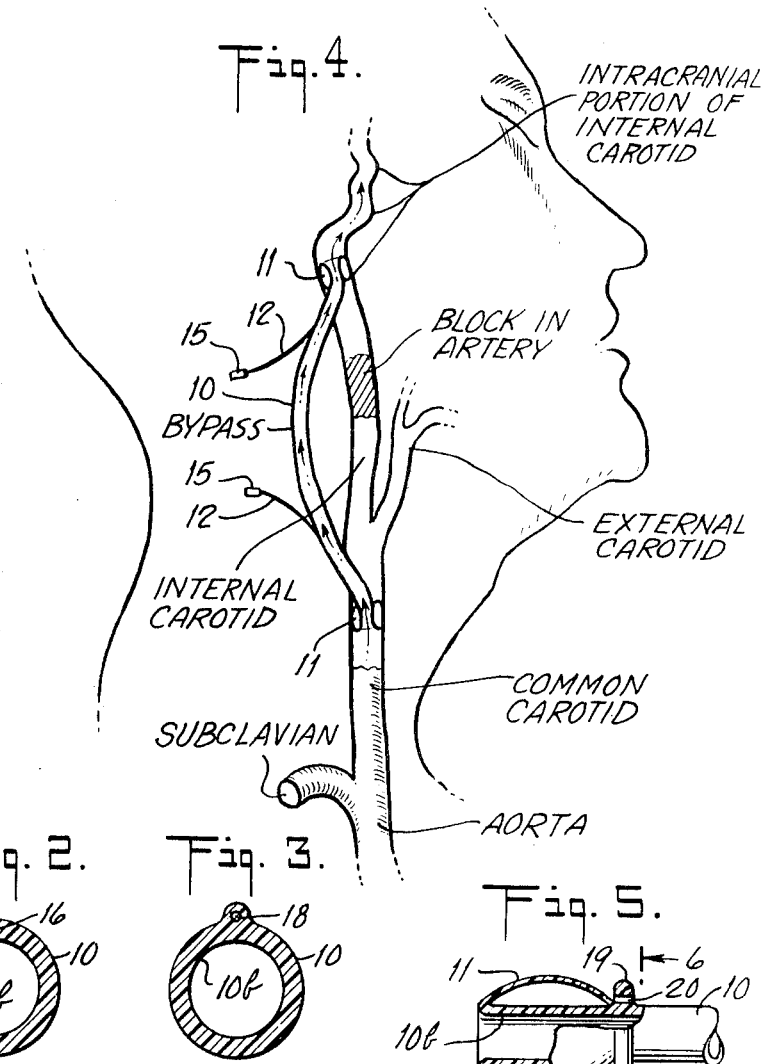
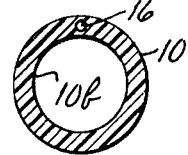
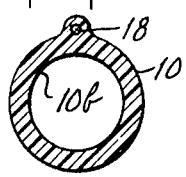
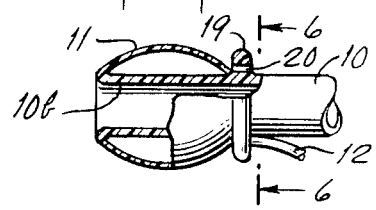
INVENTOR.
VINCENT L. MONTANTI
BY
Thomas J. Moran
ATTORNEY

United States Patent Office 3,516,408
Patented June 23, 1970

3,516,408
ARTERIAL BYPASS
Vincent L. Montanti, 71 Roderick Ave.,
Staten Island, N.Y. 10305
Filed Sept. 21, 1967, Ser. No. 669,503
Int. Cl. A61m *1/03*
U.S. Cl. 128—334                                           1 Claim

ABSTRACT OF THE DISCLOSURE

An arterial bypass useful in vascular surgery is provided by means of a length of flexible tubing, the ends of which have fixed around the outside thereof an inflatable balloon or cuff. Means are provided for inflating each of the balloons or cuffs at the end of the tubing. In use, an incision is made in the artery sufficiently large to permit the introduction of one end of the tubing. Another incision is made in the artery to permit the insertion of the other end of the tubing. As each end of the tubing is properly inserted in the artery the balloon or cuff is immediately inflated. Upon inflation the balloons serve to block off that portion of the artery between the inserted ends of the tubing and at the same time to fix the ends of the tubing to the arterial walls. In this condition blood flowing through the artery is bypassed by flowing through the tubing between the respective ends thereof thereby permitting a desired surgical procedure to be carried out upon the portion of the artery between the respective ends of the tubing. Upon completion of the surgical procedure the respective balloons or cuffs at the ends of the tubing are deflated and the tubing removed and the incisions closed. The bypass may be disposed completely within the patient during the surgical procedure or a portion of the bypass tubing may, if desired, extend without the body of the patient. If desired, other conduit connections may be incorporated in the bypass for the removal and/or testing of fluids flowing therethrough or for the introduction of drugs or other suitable medication into the fluid flowing through the bypass.

---

This invention relates to an arterial bypass useful in vascular surgery and the like. More particularly, this invention relates to an arterial bypass particularly useful in vascular surgery which permits the substantially uninterrupted flow of blood through an artery around a section or portion thereof which is to undergo suitable treatment or surgical procedure to correct an undesirable condition, such as a blockage of the artery.

Arterial bypass devices known and/or employed heretofore in vascular surgery have for the most part been complicated, cumbersome and expensive devices. Lacking a simple, easy-to-use arterial bypass device, many surgeons when carrying out vascular surgery clamp-off sections of the artery where the surgical procedure is to be carried out. Such clamping-off of the artery necessarily interrupts the flow of body fluids therethrough to those portions of the body downstream from the clamping sites. This necessarily means that the surgeon must properly carry out his surgical procedure without delay, otherwise that portion of the body downstream from the clamping sites may be adversely affected. Such a situation places a great deal of pressure upon the surgeon, particularly in operations wherein blood supplied to the brain is cut off, e.g. in an operation carried out to correct a blockage in the internal carotid artery.

Accordingly, it is an object of this invention to provide a simple, easy-to-use arterial bypass.

Another object of this invention is to provide an arterial bypass particularly useful in carrying out surgical procedures involving an artery, particularly in surgical procedures involving correcting or eliminating a blockage in the internal carotid artery.

How these and other objects of this invention are achieved will become apparent in the light of the accompanying disclosure made with reference to the accompanying drawings wherein:

FIG. 1 illustrates in partial cross section an arterial bypass in accordance with this invention;

FIG. 2 is a cross sectional view of the arterial bypass taken along the line 2—2 of FIG. 1;

FIG. 3 illustrates in cross section an embodiment of the tubing making up an arterial bypass in accordance with this invention;

FIG. 4 illustrates how the arterial bypass in accordance with this invention may be employed in a surgical procedure involving the elimination of a blockage in the internal carotid artery;

FIG. 5 is a fragmentary view in partial cross section of one end of an arterial bypass in accordance with another embodiment of this invention;

FIG. 6 is a view taking the direction of arrows 6—6 of FIG. 5; and wherein

FIG. 7 illustrates yet another embodiment of an arterial bypass in accordance with this invention.

An arterial bypass in accordance with this invention comprises a length of flexible tubing provided at the ends thereof with an inflatable cuff or balloon fixed to and surrounding the outside of the tubing. Separate means are provided for inflating the cuffs or balloons fixed to the ends of the tubing. When the ends of the tubing are inserted into an artery and the balloons inflated the inflation of the balloons serves not only to fix the ends of the arterial bypass with respect to the inner walls of the artery but also to block off the flow of any body fluids, such as blood, between the inner walls of the artery and the outside surfaces of the balloon. The body fluids normally flowing through the artery would, as a result, flow through the tubing itself, thereby bypassing that portion of the artery intermediate the ends of the tubing. Since only the ends and a minor portion of the tubing are inserted within the artery, the remaining or major portion of tubing being outside of the artery, it is now possible to suitably treat, such as by surgery, the bypassed portion of the artery. When the desired treatment has been completed the ends of the tubing are removed and any incisions made in the artery are sewn or closed. Following the removal of the ends of the tubing from the artery the fluids would then flow therethrough in their usual manner.

Referring now to the drawings, there is illustrated an arterial bypass in accordance with this invention comprising a length of flexible tubing 10 which is provided with inflatable balloons or cuffs 11 fixed to the outside of the ends thereof. Separate fluid conduit means, such as smaller flexible tubing 12, are provided for supplying fluid to the interior 11a of balloons 11. Balloons 11 are inflated by introducing thereinto a suitable liquid, such as a liquid compatible with the body fluids, by means of syringe 14 shown in dashed outline through check valve means 15 which permits the flow of the liquid thus-introduced by syringe 14 to flow via smaller tubing 12 to the interior 11a of balloon 11 so as to inflate the same. The balloon 11 in inflated condition is shown by dashed lines 17. The liquid introduced to inflate balloon 11 is retained therein by check valve means 15 so that after the introduction of the liquid syringe 14 can be withdrawn.

As indicated in FIG. 1 smaller tubing 12 is integral with the wall of tubing 10 for a portion thereof and is separate and external of the wall of tubing 10 for another portion thereof. If desired, all of smaller tubing 12 may be completely external of and separate from bypass tubing 11 as illustrated in FIGS. 5 and 7. That portion of tubing 12 integral with the wall of bypass tubing 10 and providing a fluid conduit 16 for inflating balloon 11 within the wall of bypass tubing 10 is illustrated in cross section in FIG. 2. In accordance with another embodiment illustrated in cross section in FIG. 3 smaller tubing 12 is integrally fixed along the outside of bypass tubing 10 to provide a fluid conduit 18 for inflating balloons 11.

As illustrated in the drawings, smaller tubing 12 employed for inflating ballons or cuffs 11 extends for a substantial distance in a direction along the length of bypass tubing 10. Further, the smaller tubing 12 is in direct fluid communication with the interior 11a of inflatable balloon or cuff 11 at that side thereof 11b remote from the respective end opening 10a of bypass tubing 10. As illustrated in FIGS. 1, 2 and 3 of the drawings, bypass tubing 10 may have a uniform internal diameter, the inside surface 10b being smooth and uniform with no protuberances. If desired, as illustrated in FIG. 7, one end of bypass tubing 10 may be larger than the other end and, accordingly, the internal diameter of one end of the bypass tubing may be larger than the internal diameter at another end.

FIG. 4 illustrates the use of an arterial bypass in accordance with this invention in a surgical procedure involving the removal of a block in the internal carotid artery. As indicated in FIG. 4 an incision is made in the artery above and below the block in the artery and the ends of the bypass tubing inserted. After the inflation of the inflatable balloons surrounding the ends of the bypass tubing the flow of blood through the artery is bypassed around the block in the artery by means of the bypass tubing, as illustrated, and any flow of blood between the bypass tubing and the walls of the artery is prevented due to the fact that the inflated balloon or cuff completely occupies the space between the ends of the bypass tubing and the artery. At the same time the inflated balloons serve to anchor the ends of the bypass tubing securely within the artery.

The bypass tubing may be of any suitable length or diameter, either external diameter or internal diameter, depending upon the particular need. Also, the inflatable balloons surrounding the ends of the bypass tubing may be of any suitable size. Desirably, the inflatable balloon or cuff is shaped to assume an ellipsoidal shape, rather than a spheroidal shape, when inflated without constraint. By shaping the inflatable balloon or cuff so that it tends to assume an ellipsoidal shape when inflated more surface of the balloon tends to come into contact with the walls of the artery, thereby better anchoring the ends of the arterial bypass within the artery.

Referring now to FIG. 5 of the drawings, there is illustrated therein a special embodiment of the arterial bypass in accordance with this invention wherein the end of the bypass tubing 10 is provided with a beveled flange portion 19, the flange portion being provided with perforations 20 therethrough in an axial direction, i.e. in the direction along the length of bypass tubing 10. This special embodiment of the invention is particularly useful in the case where there is difficulty in inserting the end of tubing 10 into the artery, such as in the instance where the artery is so blocked to permit only a partial insertion of tubing 10 and/or balloon or cuff 11 into the artery or in the case wherein it appears likely that insufficient fixing of the end of tubing 10 within the artery will be afforded by the inflation of balloon or cuff 11. In the use of the embodiment of the invention illustrated in FIG. 5 at least a portion of the end of tubing 10 would be inserted within the artery. The end of tubing 10, with or without partial or complete inflation of balloon 11, would then be fixed to the artery by stitching or suturing the artery to tubing 10 by taking stitches through perforations 20 of flange 19. As illustrated, perforations 20 may be large enough to permit the passage therethrough of smaller tubing 12 or, if desired, but not illustrated in the drawing, flange 19 may be provided with a notched portion to accommodate the passage of smaller tubing 12 therethrough for connection with balloon or cuff 11.

Referring again to the drawings and particularly to FIG. 7, there is illustrated therein yet another embodiment of the practice of this invention wherein bypass tubing 10 is provided with a relatively small diameter connection 10c for the withdrawal, if desired, via control outlet 10d, of the body fluids flowing through the bypass tubing 10 or for the introduction via control outlet 10d of special liquids or fluids via connection 10c into bypass tubing 10.

The bypass tubing 10, including smaller tubing 12, may be made of any suitable material, such as soft flexible material medical-grade plasticized polyvinyl chloride. Other materials besides polyvinyl chloride are useful, including polyvinyl acetate, copolymers of polyethylene with polyisobutylene, copolymers of polyethylene with acrylic esters, e.g. ethyl acrylate, etc., see for example the disclosures of U.S. 3,292,627, the disclosures of which are herein incorporated and made part of this disclosure. The inflatable balloon or cuff 11 may be made of any suitable expansible or inflatable material, such as latex, e.g. natural rubber latex tubing. If desired, the material making up inflatable balloon or cuff 11 may be made of substantially the same material as the material making up bypass tubing 10. The materials useful for inflatable balloon or cuff 11 and its structure, mode of manufacture and/or attachment to bypass tubing 10 are well known, see for example U.S. Pats. 2,230,150, 2,481,488, 3,154,077 and 3,154,078. The disclosures of these patents are herein incorporated and made part of this disclosure.

As will be apparent to those skilled in the art in the light of the foregoing disclosure, many modifications, alterations and substitutions are possible in the practice of this invention without departing from the spirit or scope thereof.

I claim:
1. A structure useful in vascular surgery as an arterial bypass comprising a flexible tubing, said flexible tubing being provided at the ends thereof with an inflatable cuff fixed to and around the outside of said tubing, each of said cuffs being provided with fluid conduit means for inflating said cuffs, at least one of the ends of said flexible tubing being provided with a flange, said flange being perforated in a direction along the length of said tubing and being positioned immediately adjacent that side of the inflatable cuff remote from the end of the flexible tubing to which said cuff is fixed.

References Cited

UNITED STATES PATENTS 2,935,068   5/1960   Donaldson _____ 128—348
3,435,824   4/1969   Gamponia _____ 128—334

L. W. TRAPP, Primary Examiner

U.S. Cl. X.R.
128—214, 348